Figure 1:
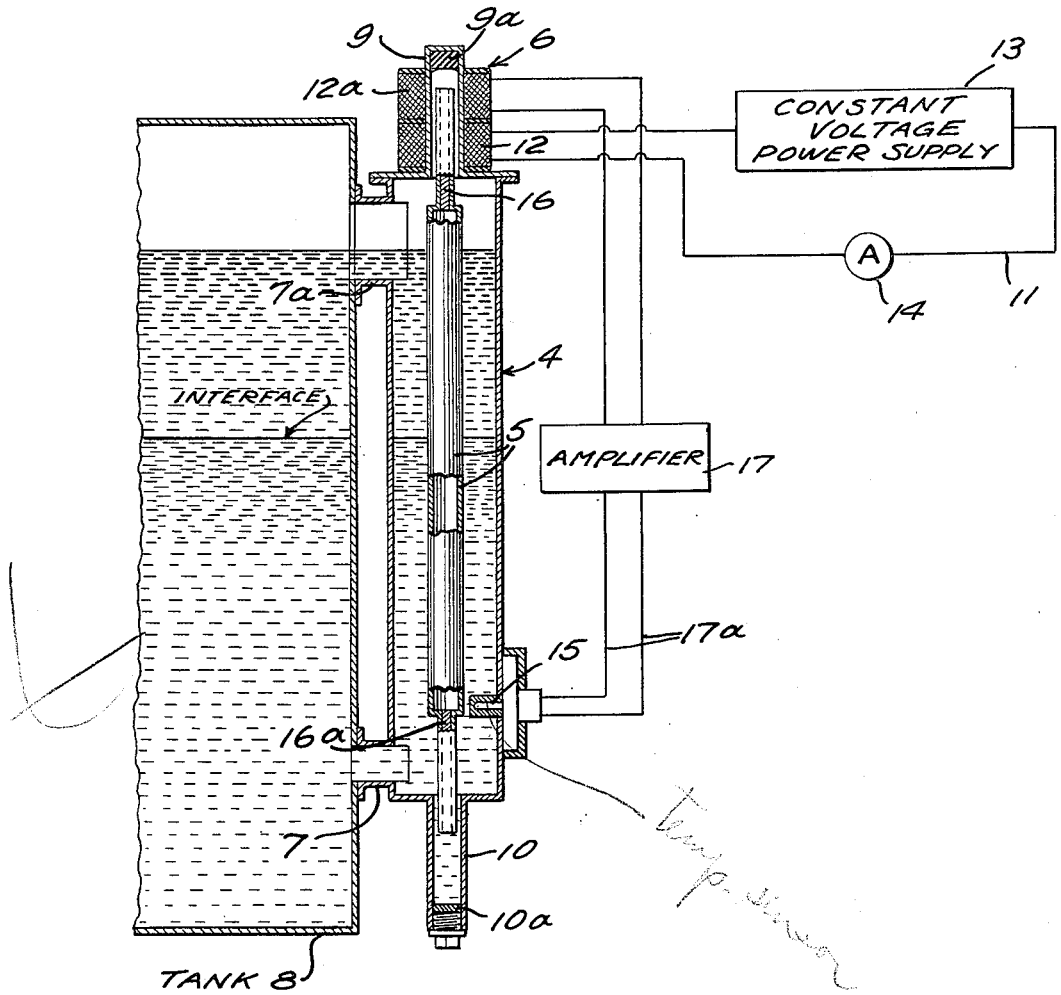

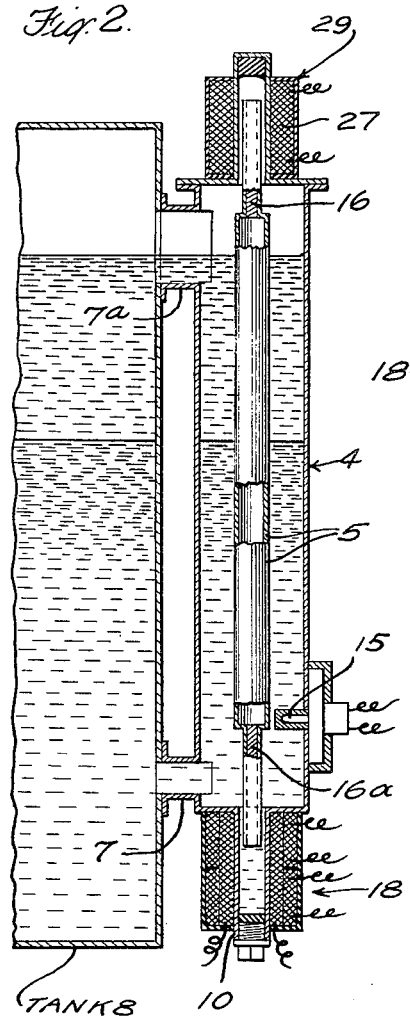
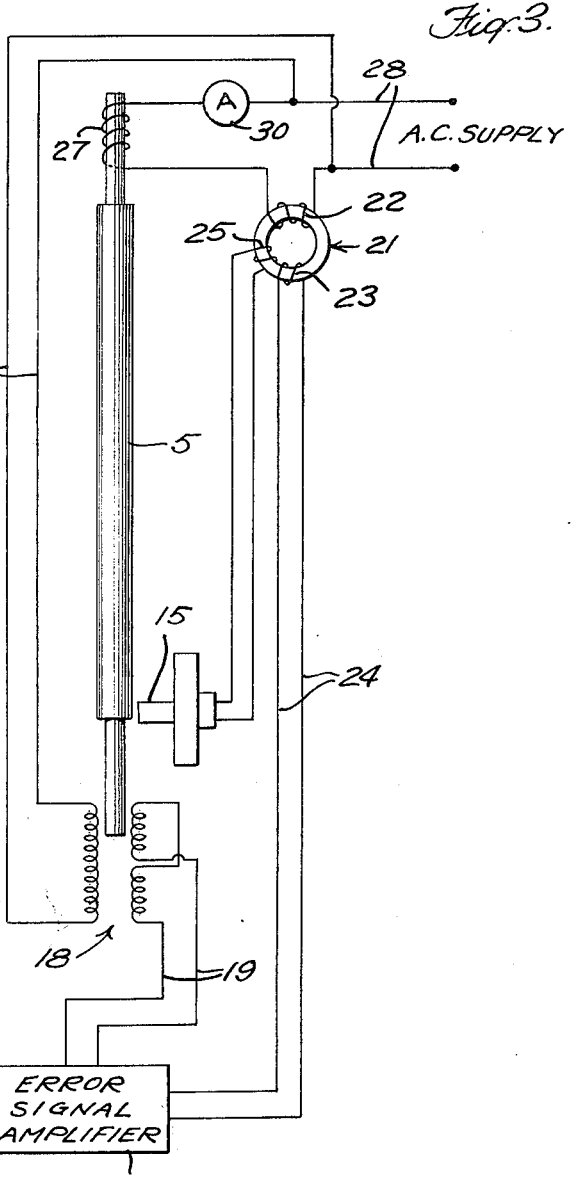
Fig. 2. Fig. 3. Fig. 4.
INVENTORS
WILLIAM T. KEATING
ALBERT RICHTER
BY
ATTORNEY United States Patent Office 2,911,828
Patented Nov. 10, 1959

2,911,828

DEVICE FOR DETERMINING LIQUID LEVEL AND INTERFACE POSITION

William T. Keating, St. Albans, and Albert Richter, Lynbrook, N.Y., assignors to The Sperry-Rand Corporation, Ford Instrument Company Division, Long Island City, N.Y., a corporation of Delaware Application March 5, 1956, Serial No. 569,566

6 Claims. (Cl. 73—290)

This invention relates to a liquid level measuring device which operates to produce an electric signal the value of which is dependent on the measured level of a liquid or the position of interface between two liquids in a container.

Conventional liquid level devices provide means for measuring the pressure differential between points in the vapor space over the liquid and some reference point below the surface of the liquid, the pressure differential being proportional to liquid level, or employ a float to follow the liquid level and transmit its movement to a mechanical or electrical position sensing device or a float which is heavier than the liquid it displaces but which utilizes the variation in buoyant force acting on the float to measure the change in liquid level.

According to the present invention a float, which is heavier than the displaced medium, is supported partially by the liquid in which it is submerged and partially by a solenoid magnet which changes its strength inversely to the force of buoyancy and thus maintains the float in a given position of equilibrium. The change in the field strength of the solenoid serves to measure the change in buoyancy and the change in liquid level assuming the relation between them is known. The liquid level that is desired for measuring purposes may be the surface of a single density liquid or the position of interface of liquids of different density.

It is thus apparent that the operation of the device does not depend on the detection of float movement by mechanical or magnetic sensing means and, accordingly, there is eliminated any need of sealing the liquid chamber or of converting a force or movement to an electrical or pneumatic signal for transmission to a control or indicating device.

The preferred embodiment of the invention is illustrated in the accompanying drawings, wherein:

Fig. 1 is a section in elevation of a liquid level device without error signal producing means;

Fig. 2 is a section in elevation of a modified liquid level measuring device showing means for controlling the current in the solenoid magnet including a temperature control and a linear transformer for procuring an error signal; and Fig. 3 is a schematic showing the electrical diagram for the modified device shown in Fig. 2; and Fig. 4 is a schematic showing a modified temperature control arrangement.

As illustrated in Fig. 1, the device comprises essentially a liquid chamber 4, a float 5 entirely enclosed by the chamber 4 and a solenoid magnet 6 supported by the chamber at one end thereof.

The liquid chamber comprises a cylindrical tube having a short pipe section 7 communicating therewith near its bottom end which serves to admit liquid of single or dual density to the chamber as from a tank 8. A pipe section 7a is similarly provided near the top portion of the chamber which serves as an air escape so that the air and vapor pressure over the liquid in the chamber is kept constant. Top and bottom thimbles 9 and 10, respectively, provide hollow, tubular extensions for the chamber being of lesser diameter than that of the chamber. Stops 9a and 10a are provided at the end of the top and bottom thimbles, respectively, to protect the float and its associated elements on striking either end of the chamber. The chamber is preferably made from stainless steel to inhibit corrosion and for its low permeability.

The solenoid magnet 6 is supported by the chamber 4 and consists of an A.C. electromagnet having a core which is adapted to receive the thimble 9 located at the top end of the float chamber. A core winding 12 is energized by a constant voltage source 13, its output being connected to a current indicator 14 in line 11. The output could, of course, be a magnetic amplifier or other signal reproducing device which would be made responsive to changes in the solenoid flux due to changes in the liquid volume within the chamber as explained below. Preferably a temperature sensitive device 15 such as a thermistor is supported on the outer wall of the chamber 4 and is thermally insulated from the surrounding air being responsive therefore solely to temperature changes occurring on the wall of the chamber corresponding to temperature changes in the liquid. The temperature sensitive device 15 is connected by line 17a to amplifier 17 and coil 12a which is insulated from the coil 12 on the solenoid magnet 6 and controls the current in the solenoid according to the effect on the buoyancy of the liquid as produced by its temperature. Generally, where the buoyancy increases, the strength of the magnet should decrease and vice-versa so that the total of the two forces remains constant. If desired, a thermistor may also be disposed in the vicinity of the power supply or solenoid so as to reflect any change of resistance in those elements which is due to heat.

The float 5 is a cylindrical steel tube which has a uniform cross-section over a length sufficient to cover the range of liquid level to be measured. The hollow end sections of the float have a reduced cross-section, being adapted to be received by the thimbles 9 and 10, and are sealed so that the inside of the float is isolated from the liquid. Slugs 16 and 16a of highly permeable magnetic material are carried within the top and bottom end sections, respectively, of the float which serves as an armature for the solenoid magnet 6.

The name float is not entirely apt since this element is heavier than the total fluid that it can displace. Actually the weight of the float is counterbalanced by the electromatic force exerted upwards by the solenoid magnet 6. As the liquid level rises, the weight of the float is decreased by the weight of the liquid that it displaces. Since the cross-section is uniform, the decrease in the weight of the float will depend predictably on the level of the fluid.

Assuming that the liquid or interface level in the chamber is rising and the permeable slug 16 is entering the end of the solenoid coil of the magnet 6 due to the increase in the buoyancy acting on the float, the force attracting the slug will increase until a limiting value of leakage flux is reached. Moving the float still further into the coil would cause it to be acted on by a constant force if the current were held constant. However, the presence of the slug will increase the inductance and hence the reactance of the coil. The increased reactance will decrease the current since the supply voltage is constant. Decrease in the current will decrease the magnetic field and the force of attraction on the armature will decrease. Thus, if the slug were moved into the coil at a uniform rate, the force acting on it would rise sharply, level out and then begin to fall off almost linearly. The rising motion of the float is restricted to the region where the leakage flux is constant since the float will move out of the suspension coil of the solenoid magnet when the flux levels off and the strength of the field decreases. When the level falls the float increases its effective weight and moves out of the suspension coil until the increased field in the coil matches the weight increase. Thus, the equilibrium position is reached for every rise and fall of the liquid level and the change in the magnet field required to maintain the float in this position during changes in the liquid volume is used as a measure of the liquid level.

As shown in Figs. 2 and 3 a linear, differential transformer 18 of conventional design may be disposed about the lower thimble 10 which is adapted to receive the hollow end enclosing the slug 16ª carried in the reduced bottom end of the float, sufficient clearance being provided between the bore of the thimble 10 and the end of the float to insure free motion of the float. A transformer of this type has three windings, a single primary winding, which is energized by an A.C. supply line 28 and connecting line 18ª, and a pair of secondary coils which are arranged with opposing polarity so that the voltage induced in them will buck each other. Line 19 connects the secondary coils of the transformer to an amplifier 20 which normally rectifies the signal produced by the transformer. A saturable core reactor 21 has an anode winding 22 connected into the supply line 28. The core reactor 21 is also provided with a control winding 23 connected to the amplifier 20 by means of lines 24 and a biasing winding 25 connected to the thermistor 15. The core impedance in the reactor 21 is thereby governed by the liquid temperature in the chamber and the induced currents in the secondary coils of the linear transformer. The current in the line 28 and winding 27 of solenoid magnet 29, which is similar to the solenoid magnet 6 except that it has no winding connected directly to the thermistor, is therefore principally controlled by the position of the float and the bottom magnetic core piece or slug 16ª carried thereby. When this slug is positioned symmetrically in the transformer, the voltages induced in each secondary coil will be exactly equal and cancel so that the output is zero. When the core piece moves to either side of zero, that is, away from equilibrium position, the voltage in one of the secondary coils will be greater than that in the other, and an A.C. error signal is produced which is demodulated by the amplifier 20. The phase of the error signal is governed by the relative magnitudes of the oppositely induced voltages in the secondary coils and the polarity of the D.C. signal applied to winding 23 on the saturable reactor is determined thereby.

If desired, the amplifier 20 may be operated to pass an A.C. current which might be employed, for example, to control a magnetic amplifier as the source for the supply line 28.

According to the modification shown in Fig. 4 a single solenoid winding 32 is arranged on the A.C. magnet in place of the two windings 12 and 12ª shown in the embodiment of Fig. 1. A transformer 31 having a secondary winding in the supply line 11 and primary winding in the line 17ª is connected to the output of the amplifier 17, so that the constant voltage and temperature correction signals may be combined externally. Accordingly, the current in the supply line is controlled by the temperature as well as volume of the liquid in the chamber 4. Other modifications of the device may occur to one skilled in the art without departing from the scope of the invention as defined by the appended claims.

What is claimed is:

1. A liquid level measuring device comprising a liquid chamber having air and liquid pipe sections communicating therewith, a float within said chamber, a permeable element carried by one end of said float, a solenoid magnet supported by said chamber at the top end thereof, said magnet having a central core adapted to receive said permeable element as an armature therefor, a constant voltage source connected to said solenoid magnet, current indication means connected to the output of said solenoid magnet, said means being responsive to the changes in current required to maintain the equilibrium position of said float at substantially any level of liquid and a temperature sensitive, electric element insulated from the surrounding air and supported in heat conductive contact with said chamber, said element being arranged in flux controlling connection with said solenoid magnet whereby the magnetic flux produced by said magnet may be modified according to the temperature of said chamber.

2. A liquid level measuring device as claimed in claim 1 wherein the solenoid magnet is provided with a pair of insulated windings one of said windings being connected to said constant voltage source and the other being connected to said temperature sensitive element.

3. A liquid level measuring device comprising a liquid chamber having air and liquid pipe sections communicating therewith, a float within said chamber, a permeable element carried by the top end of said float, a solenoid magnet supported by said chamber at the top end thereof, said magnet having a central core adapted to receive said permeable element as an armature therefor and provide a magnetic force of attraction between said magnet and said permeable element thereby to enable the float to be suspended from the top of said chamber, a constant voltage source connected to said solenoid magnet and current indication means connected to the output of said solenoid magnet, said means being responsive to the changes in current required to maintain the equilibrium position of said float at substantially any level of liquid wherein said voltage source includes an A.C. line and a second permeable element is carried by the bottom end of said float, a linear differential transformer is provided at the bottom end of said chamber, the said transformer having a core adapted to receive said second permeable element as an armature therefor, a primary winding and a pair of oppositely poled secondary windings arranged on said core, said voltage source being connected to said primary winding, and said current indicating means is connected to said secondary windings and said A.C. line, whereby any movement of the float from equilibrium position may be described therein.

4. A liquid level measuring device comprising a liquid chamber having air and liquid pipe connections communicating therewith, a float within said chamber, a permeable element carried by the top end of said float, a solenoid magnet supported by said chamber at the top end thereof, said magnet having a central core adapted to receive said permeable element as an armature therefor and provide a magnetic force of attraction between said magnet and said permeable element thereby to enable the float to be suspended from the top of said chamber, a constant voltage source which includes an A.C. line connected to said solenoid magnet, current indication means which is responsive to the changes in current required to maintain the equilibrium position of said float at substantially any level of liquid connected to the output of said solenoid magnet, a second permeable element carried by the bottom end of said float, a linear differential transformer having a core adapted to receive said second permeable element as an armature therefor disposed at the bottom end of said chamber, a primary winding and a pair of oppositely poled secondary windings arranged on said core, means connecting said voltage source to said primary winding, current responsive means connected to said secondary windings and said A.C. line by which any movement of said float from equilibrium position is indicated, said current responsive means comprising an amplifier and a saturable reactor, said reactor having an anode winding connected to said A.C. line and the solenoid magnet and a control winding connected to said amplifier whereby the current delivered to said solenoid magnet may be modified in accordance with the output of said transformer as determined by the movement of said float and said second permeable element carried thereby.

5. A liquid level measuring device as claimed in claim 4 wherein there is provided a temperature sensitive element insulated from the surrounding air and supported in heat conductive contact with said chamber, a biasing winding is disposed on said saturable reactor and said biasing winding is connected to said temperature sensitive element whereby the current delivered to said magnetic solenoid may be modified according to the temperature of the liquid in said chamber.

6. A liquid level measuring device as claimed in claim 5 wherein said temperature sensitive element is a thermistor.

References Cited in the file of this patent
UNITED STATES PATENTS

| | | |
|---|---|---|
| 1,658,449 | Loffer | Feb. 7, 1928 |
| 1,826,024 | Roller | Oct. 6, 1931 |
| 1,880,563 | Weckerly | Oct. 4, 1932 |
| 2,026,299 | Boyd | Dec. 31, 1935 |
| 2,072,223 | Scott | Mar. 2, 1937 |
| 2,273,850 | Ewald | Feb. 24, 1942 |
| 2,282,538 | Yarnall | May 12, 1942 |
| 2,564,305 | Hicks | Aug. 14, 1951 |
| 2,664,011 | Boonshaft | Dec. 29, 1953 |